(12) United States Patent
Schuler et al.

(10) Patent No.: US 9,047,519 B2
(45) Date of Patent: Jun. 2, 2015

(54) OPTOELECTRONIC APPARATUS FOR MEASURING STRUCTURAL SIZES OR OBJECT SIZES AND METHOD OF CALIBRATION

(71) Applicant: Sick AG, Waldkirch (DE)

(72) Inventors: Pascal Schuler, Waldkirch (DE); Dietram Rinklin, Waldkirch (DE); Sascha Burghardt, Waldkirch (DE)

(73) Assignee: SICK AG, Waldkirch (DE)

( * ) Notice: Subject to any disclaimer, the term of this patent is extended or adjusted under 35 U.S.C. 154(b) by 179 days.

(21) Appl. No.: 13/796,746

(22) Filed: Mar. 12, 2013

(65) Prior Publication Data

US 2013/0256411 A1    Oct. 3, 2013

(30) Foreign Application Priority Data

Mar. 29, 2012 (DE) .......................... 10 2012 102 702
Apr. 20, 2012 (DE) .......................... 10 2012 103 495

(51) Int. Cl.
*G06K 7/00* (2006.01)
*G06K 7/10* (2006.01)
*G06K 7/14* (2006.01)
*G06T 7/00* (2006.01)

(52) U.S. Cl.
CPC ............ *G06K 7/0095* (2013.01); *G06T 7/0018* (2013.01); *G06K 7/146* (2013.01)

(58) Field of Classification Search
USPC .............................. 235/438, 435, 454, 462.01
See application file for complete search history.

(56) References Cited

U.S. PATENT DOCUMENTS

2003/0197063 A1* 10/2003 Longacre, Jr. ........... 235/462.08
2008/0143838 A1   6/2008 Nadabar et al.
(Continued)

FOREIGN PATENT DOCUMENTS

DE         199 21 778 A1   10/2000
DE   10 2005 003254 B4   10/2007
(Continued)

OTHER PUBLICATIONS

European Patent Office, European Search Report, Application No. EP 13 15 2965, dated Jul. 4, 2013, six (6) pages.
(Continued)

*Primary Examiner* — Michael G Lee
*Assistant Examiner* — Laura Gudorf
(74) *Attorney, Agent, or Firm* — Nath, Goldberg & Meyer; Jerald L. Meyer; Tiffany A. Johnson (57) ABSTRACT

An optoelectronic apparatus is set forth for measuring structural sizes or object sizes which has a light reception element for converting received light into image data, a reception optics arranged before the light reception element as well as an evaluation unit which is configured to identify structures or objects in the image data, to determine its dimensions in picture elements and to convert the dimensions into absolute, in particular metric, units of length with reference to a scaling factor, wherein the scaling factor can be determined in a calibration procedure. In this respect, the evaluation unit is configured to locate code regions in the image data and to read out code information from the code regions and to calculate the scaling factor during the calibration procedure from dimensions of a calibration code whose code information includes a size indication for the calibration code in the absolute units of length.

17 Claims, 3 Drawing Sheets

(56) References Cited

U.S. PATENT DOCUMENTS

| | | | |
|---|---|---|---|
| 2009/0072037 A1* | 3/2009 | Good et al. | 235/462.35 |
| 2009/0200380 A1* | 8/2009 | Longacre et al. | 235/462.11 |
| 2011/0157373 A1* | 6/2011 | Ye et al. | 348/187 |

FOREIGN PATENT DOCUMENTS

| | | | |
|---|---|---|---|
| EP | 1 176 557 A1 | 1/2002 |
| JP | 2009264963 A | 11/2009 |
| JP | 2009294465 A | 12/2009 |

OTHER PUBLICATIONS

International Cover Letter re: Japanese Patent Application No. 2013-060010 dated Mar. 3, 2014, three (3) pages.

German Examination Report of Application No. DE 10 2012 103 495.8.

* cited by examiner

Object X

Neck width:
1.278 cm

OPTOELECTRONIC APPARATUS FOR MEASURING STRUCTURAL SIZES OR OBJECT SIZES AND METHOD OF CALIBRATION

The invention relates to an optoelectronic apparatus for measuring structural sizes or object sizes and to a method of calibration in accordance with the preambles of claims 1 and 13 respectively.

The detection or camera system has to be calibrated for the optical measurement of objects. Dimensions of any desired measured sections, objects or lines in picture elements should thus be able to be determined and then to be converted into a physical unit such as millimeters on the basis of the calibration. Since a high measurement accuracy is generally desired, the calibration should also be as exact as possible.

The conversion is only possible if the detection system is capable of a correct allocation of any desired number of picture elements to the physical unit. Additional knowledge on the real measurement situation is required for this purpose which is determined via the calibration and is supplied to the detection system.

A model approach via the optics of the detection system is frequently used. Such models necessarily include simplifications and error tolerances can also accumulate so that the model usually does not reflect reality exactly enough.

Special patterns are often used for the calibration, for instance checkered patterns. Such patterns have to be exactly segmented since if, for example, corner points were not found exactly, it is unclear how successful the calibration was because there are is no feedback on the accuracy of the pattern detection. In addition, the detection system still has to obtain additional information on the actual sizes of the pattern elements.

It is also known to place a benchmark in images such as a match or a scale. This is usually only used as an optical reference for a human observer, but not for a calibration for automatic conversion. Even if calibration should be carried out using such a scale, it is necessary to communicate to the detection system in another manner what absolute size the scale has, that is how large a match is or how large the metric distance between two scale divisions is.

Another application of cameras than for measurement work is the reading of codes. Such camera-based code readers are increasingly replacing the still widespread barcode scanners. Objects with the codes located thereon are taken with the aid of an image sensor and the code regions are identified and decoded in the images. Camera-based code readers also cope without problem with different code types than one-dimensional barcodes which also have a two-dimensional structure like a matrix code and provide more information.

It is known from DE 10 2005 003 254 B4 to parameterize an optoelectronic sensor for securing a machine in that an optical code having parameterizing information is detected. The sensor is, however, not used for measurements and the parameterizing information do not include any reference to physical lengths.

A code reader for manual operation using a read-in calibration code is configured in US 2008/0143838 A1. This code reader is also not suitable for measurement applications and the calibration code does not include any information on physical dimensions.

It is therefore the object of the invention to improve the calibration of an optical measurement system.

This object is satisfied by an optoelectronic apparatus for measuring structural sizes or object sizes and by a method of calibration in accordance with claims 1 and 13 respectively.

The solution in this respect starts from the basic idea of placing the required information on its absolute dimensions directly in the calibration target. For this purpose, an optical code is used as the calibration target which the apparatus for measurement, which is simultaneously configured as a code reader, reads and decodes. The dimension of the calibration code in picture elements is thus available from the detected image data, on the one hand, and, on the other hand, the absolute size of the calibration code is available for comparison from the reading out of the size information encoded in the calibration code itself. A corresponding scaling factor can be calculated from this which indicates how many picture elements correspond to a physical unit of length such as a millimeter. Dimensions of any desired structural elements can subsequently be detected in picture elements with the aid of this scaling factor and can be transformed into physical, for example metric, units of length. A specific structure to be measured is the code itself or its module size since knowledge of these dimensions in absolute units is desired in many applications.

The size indication contained in the calibration code relates to any desired dimension, for example its width, height, diagonal or also to an individual module width. Which dimension is encoded is either communicated to the apparatus in advance or this information is also included in the calibration code. The structure from which the dimension used for the calibration is determined in picture elements should then correspond to the encoded size indication or it is suitably converted.

The invention has the advantage that the calibration is substantially simplified and simultaneously becomes particularly accurate. Inaccuracies of the measurement resulting from an insufficient calibration are thus prevented such as occur, for instance, with calibrations with the aid of an optical model. Since the calibration code itself includes its own size indication and since this information is transmitted without loss on reading the code, no incorrect scaling factors due to incorrect information or incorrect measurements of the calibration target can be determined.

The evaluation unit is preferably configured to check an identifier when reading out the calibration code by means of which identifier the calibration code as such can be recognized. It is thereby ensured that only a calibration code is used for the calibration and not any random size information. In a preferred embodiment, it is even possible that a calibration code recognized with reference to the identifier triggers the calibration. As soon as the apparatus correspondingly set to automatic calibration then therefore recognizes a calibration code valid for this apparatus, the scaling factor is checked or recalculated.

The evaluation unit is preferably configured to determine the dimensions of the calibration code from corner to corner during the calibration process. Accordingly, the size indication included in the calibration code should also relate to this dimension or it is converted accordingly. A reference to the corners is particularly advantageous because the largest possible structure is thus utilized and the calibration or the determination of the scaling factor is thereby particularly accurate.

The evaluation unit is preferably configured to use an error-free reading of the calibration code for the determination of the scaling factor. If the image sequence is fast enough for a multiple reading, an error-free reading is selected; optionally, however, the calibration is also repeated with a reading of the calibration code. Error-free here does not just mean that it was possible to detect the code information at all, which is anyway a basic requirement, but rather that the calibration code was able to be scanned without any error. For the dimensions in picture elements are then also detected free of error, for example the corner points which define the width and height of the calibration code. Whether an error correction such as a Reed-Solomon correction was required for determining the code content can be used as a criterion for an error-free reading. In this manner, the code reading provides implicit feedback on whether the calibration was successful and the scaling factor was accurately determined. For if no error correction is required, the image segmentation and the determination of the code region was also successful; the position of the corners is thus precisely determined. Otherwise, the scanning grating would namely not be ideally positioned in these preprocessing steps and error correction bits would be used up. A proper decoding procedure without the need for an error correction thus provides information on the accuracy of the segmented corner points, thus of the scaling factor and of the calibration as a whole.

The evaluation unit is preferably configured to read out absolute geometry information from the calibration code and to determine a transformation rule which transforms the relative geometry of the calibration code in the image data into an absolute geometry. Due to perspective distortion, the calibration code is generally not taken such that its actual geometry can be recognized in the two-dimensional image data. A rectangular calibration code is distorted to form a trapezoid, for example. The absolute geometry, namely the rectangular form, is, however, known in advance together with its dimensions or is likewise part of the information which is taken from the calibration code. It is thus possible to determine those transformations which transform the relative geometry of the calibration code, that is for example a trapezoid, into its actual or absolute geometry, namely into a rectangle in the example. A transformation is accordingly available to correct the perspective distortion so that the calibration procedure becomes independent of the orientation of the code reader. The accuracy of the later measurements is thereby increased and the measurement at any desired spatial angles is make possible because distortion is calculated out.

The evaluation unit is preferably configured to recognize an incorrect calibration in that the transformation rule is applied to a code in the image data and a check is made whether the code transformed in this manner has an expected absolute geometry. After the calibration procedure, the orientation of the camera can be changed intentionally or unintentionally. The transformation rule which was determined in the calibration rule no longer fits after this. This is recognized in that the application of the transformation rule to a code no longer results in its expected geometry, for example a rectangle.

The evaluation is preferably configured to apply the transformation rule to a part region of the image data to generate a perspectively distorted image. This serves for the visualization and thus also the checking of the decoding and measurement results, and can be assisted in that additional information is added to the image, for instance an image title, decoded code information or a measured length. A structured overlay format such as XML can be used as the format. The cannot only be displayed in a well-defined manner, but also obtains the total image information instead of overwriting pixels with the additional information.

The apparatus is preferably configured as a camera-based code reader whose light reception element is a matrix-like or linear image sensor. Such a camera-based code reader can detect a plurality of different codes and can simultaneously be used for the optical measurement.

The evaluation unit is preferably configured to determine picture elements having a finer resolution than the pixel resolution of the image sensor by averaging or interpolation. The measurement can achieve accuracies above the physical resolution of the image sensor by such a subpixel resolution.

The evaluation unit is preferably configured for the decoding of 1D codes and 2D codes, in particular of codes which are made up of bars or rectangular or square module units. 1D codes are usually barcodes. Some non-exclusive examples for conventional 2D codes are DataMatrix, QR-Code, Aztec-Code, PDF417 or MaxiCode.

A distance measuring unit is preferably provided, in particular using the principle of the time of flight of light determination, to determine the distance from a read code or from a detected object. Such distance measurements are frequently used for an autofocus adjustment. Calibration codes and structures to be measured are thus, however, not only detected in two-dimensional image data, but rather the reading distance can additionally be determined as a third dimension.

A memory is advantageously provided to store, together with the scaling factor, the calibration reading distance at which the calibration code was detected during the calibration procedure, and with the evaluation unit being configured to adapt the dimensions of detected structures or objects using their actual distance during the detection with the aid of the calibration reading distance. The scaling factor first only applies to the reading distance or to the focus adjustment during the detection of the calibration code. A rescaling can accordingly take place with the aid of the stored reading distance during the calibration and with the aid of the actual reading distance on a measurement so that the restriction to one reading distance or the introduction of measurement errors in changed reading distances can be omitted.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in.

Figure 1:
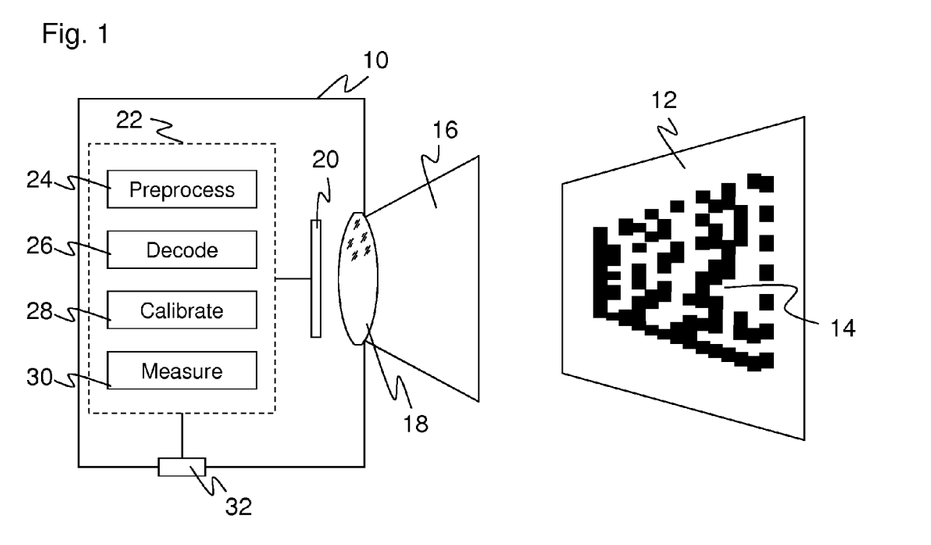
FIG. 1 a schematic sectional representation of a camera.

FIG. 1 shows a schematic sectional representation of a camera 10. The camera is used, on the one hand, for the measurement of structures and is simultaneously a camera-based code reader, since it is able to detect codes and to read out their contents. The invention will be described for the example of a camera. It is, however, generally also conceivable that image data are acquired using a different optical principle, for instance by scanning with a reading beam.

The camera 10 detects a taking zone 12 in which codes 14 to be read or any other objects may be located. The light from the taking zone 12 is received by a taking objective 16 in which only a shown lens 18 represents the taking optics. An image sensor 20, for example a CCD chip or CMOS chip having a plurality of pixel elements arranged to form a row or a matrix generates image data of the taking zone 12 and passes them on to an evaluation unit designated as a whole by reference numeral 22. The camera 10 can be equipped with active lighting, not shown, for a better detection of the code 14 or of other objects in the taking zone 12.

The evaluation unit 22 is implemented on one or more digital modules, for example microprocessors, ASICs, FPGAs or the like which may also be provided fully or partly outside the camera 10. Not only the physical modules, but also the functional modules of the evaluation unit 22 are shown, namely a preprocessing unit 24, a decoding unit 26, a calibration unit 28 and a measurement unit 30.

In the preprocessing unit 24, the image data are, for example, first filtered, smoothed, normed for brightness, cut to size for specific hones or binarized. In addition, structures of interest are recognized and segmented, for example individual objects, lines or code regions.

The decoding unit 26 is able to decode codes in code regions identified in this manner, that is the information contained in the code.

The calibration unit 28 serves for a calibration of the camera 10 to absolute physical units of length. This calibration is based on the reading out of a specific calibration code with the aid of the decoding unit 26 and will be explained in more detail further below with reference to FIG. 2.

Structures such as objects, lines or codes could be measured in the measurement unit 30. The dimensions are first determined in picture elements. It is often possible by various processes of interpolation, averaging or filtering to achieve a subpixel resolution in which the picture elements have a finer resolution than the physical resolution of the image sensor 20. The dimensions are converted into an absolute, for example metric, system of units with the aid of a scaling factor which was determined in advance in the calibration unit 28 and which indicates a conversion of picture elements into a physical unit.

Data can be output at an output 32 of the camera 10, and indeed both evaluation results such as read code information or determined dimensions in absolute units and data in different processing stages such as raw image data, preprocessed image data, dimensions in picture elements, identified objects, not yet decoded code image data or also the scaling factor itself.

Figure 2:
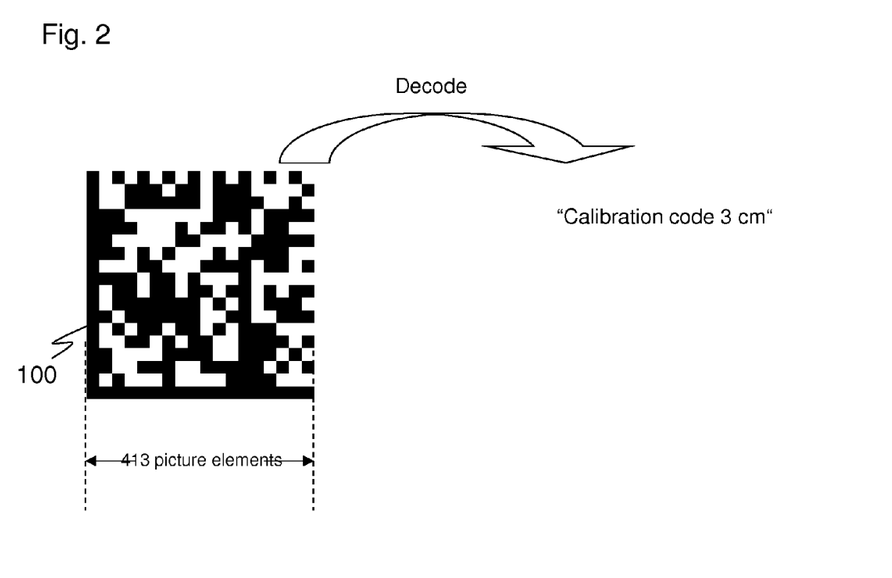
FIG. 2 the representation of a 2D code and its code content for explaining a calibration method for a measurement in absolute units of length.

The calibration will now be explained with reference to FIG. 2. FIG. 2 shows a calibration code 100, with it here being a DataMatrix code purely by way of example. Equally, however, any other desired code types can also be processed as long as the decoding unit 26 is able to read the code. Such codes frequently comprise bars or rectangular or square module units. Codes having error correction mechanisms are preferably utilized as the calibration code for more robust code reading and to obtain feedback on the quality of the calibration.

The calibration code 100 is intended to communicate the required knowledge on the physical world and thus the relationship between the size of a picture element and an absolute unit of length, that is the scaling factor, to the camera 10 via its code content. The calibration code 100 therefore contains a size indication on itself, in metric units here, as the code information. It is simultaneously advantageous if the code information also makes the calibration code 100 recognizable per se.

As can be recognized at the right in FIG. 2, the content of the calibration code 100 shown by way of example is "calibration code 3 cm" after being read out by the decoding unit 26. The camera 10 therefore knows that it is a calibration code and that this calibration code 100 is 3 cm in size in absolute units of length. In this respect, the agreement is assumed that the size indication relates to the width. This could also additionally be communicated via the code content, for example by the code content "calibration code, width: 3 cm". The width is only an example for a size indication; the height, the diagonal, the physical dimension of a code module and any other identifiable dimension of the calibration code 100 can be used equally well.

However, it has advantages if the calibration takes place using a structure of the calibration code 100 which is as large as possible because the scaling factor is then particularly accurate. The width, height or diagonal are preferably suitable for this purpose. In addition, corner points of a code are recognized very exactly by the preprocessing unit 24 and the decoding unit 26, as otherwise the calibration code 100 could usually not be read at all. To make absolutely sure that the corner points of the calibration code 100 were determined properly, a detection of the calibration code 100 with an associated determination of the corner points is used for the calibration in which no correction bits have to be used, for example in accordance with a Reed-Solomon correction. Such a calibration code 100 was scanned and read without error so that the positions and thus the distances of the corner points are also reliable.

The measurement unit 30 determines the width of the detected calibration code in picture elements from these corner points. The result in this example of FIG. 2, which is arbitrary in this respect, is 413 picture elements. It is thus now known to the calibration unit 28 that 413 picture elements correspond to 3 cm. The ratio of these two values is the sought scaling factor for converting picture elements into metric units of length.

In a specific, exemplary preferred embodiment, the calibration process runs as follows: First, in an auto-setup mode, the calibration code 100 is determined after an image setting and a focus adjustment and the calibration code is recognized as such with reference to its identifier. The camera 10 then switches into the calibration mode.

The dimensions of a code module of the calibration code 100 are then calculated in picture elements in that the total height and the total width is divided by the code module number n×m in the direction of width and height, said code module number being known from the type of code with which a successful decoding was able to be carried out. The result can include fractions of physical pixels of the image sensor 20; i.e. it has a subpixel resolution. The calculation can be repeated for different recognized code modules and averaged.

The calibration code 100 in this embodiment, unlike the example of FIG. 2, includes the size indication for a code module, not for the total width. Otherwise, this could, however, also be converted as just explained. The scaling factor which indicates how large a picture element is in millimeters can be calculated using the information on the size of a code module in both picture elements and millimeters, or vice versa.

This scaling factor, which simultaneously represents a calibration constant, is preferably stored for the later use. The measurement unit 30 can then use the scaling factor in the further operation after the end of calibration and auto-setup in that dimensions of the structures to be measured are converted into absolute dimensions by simple multiplication.

The scaling factor initially only applies to the reading distance at which it was determined. This reading distance is frequently fixed at the associated focus setting. With knowledge of the syntax of the code content of the calibration code 100, it is very easily possible also to produce a suitable calibration code 100 in the on-site measurement use. A wide flexibility for different reading distances thus results.

It is also conceivable to equip the camera 10 with a distance measurement, for example using the principle of the time of flight of light. This is anyway frequently used for an autofocus unit in a camera 10. The original reading distance can then be stored at which the scaling factor was determined with reference to the calibration code 100. The measurement unit 30 can then carry out a rescaling using this original reading distance and the actual reading distance during a measurement. Since assumptions go into this rescaling, it is not quite as exact as a specific recalibration using a suitable calibration code 100; however, it can allow an adjustable reading distance or measurement distance at least within a certain framework.

The measurement described up to here works with a low skew of the camera 10, that is, in other words, highly precisely with a sufficiently orthogonal alignment of the optical axis of the camera 10 to the codes 14 to be read or the objects to be measured. This orientation of the camera 10 is, however, not always ensured, but rather a certain deviation is even desired in contrast, for example with shiny surfaces, in order not to reflect too much light back into the camera 10. Perspective distortion thereby occurs which impairs the accuracy of the measurement.

Figure 3:
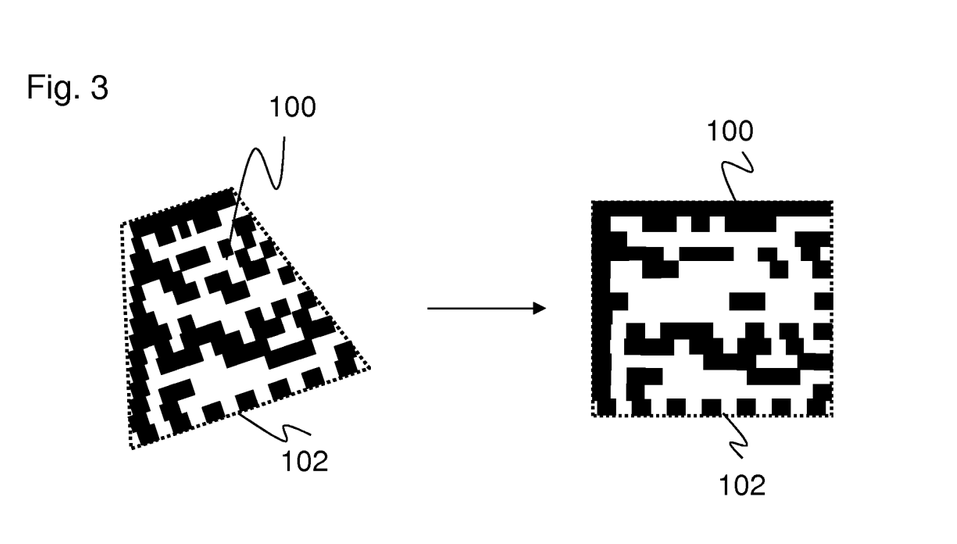
FIG. 3 shows the left hand part of the calibration code taken with a perspective distortion.

FIG. 3 shows in the left hand part the calibration code 100 which was taken with such a perspective distortion. The envelope 102 of the calibration code 100 is therefore no longer square or rectangular, but rather trapezoid. The measurement thereby becomes inaccurate because the independence from the position of the measurement within the image taken by the camera 10 is lost. Provision is therefore made in an embodiment to correct this perspective distortion.

This will be described with reference to the example of a rectangular calibration code 100. Other geometries are, however, equally conceivable. The positions of the four corner points of the calibration code 100 are known with high accuracy due to the code reading in the decoding unit 26. What geometry the calibration code 100 actually has is known, on the other hand. This knowledge can be predefined because, for example, it is known that the code has to be rectangular with a specific ratio of height to width (aspect ratio). Alternatively, the geometry information can be communicated via the code content, for example via a code content such as "calibration code: rectangle, width 3 cm, height 4 cm".

It is therefore possible to calculate a transformation, for example, via an imaging matrix M which transforms the corner points of the distorted calibration code 100 into the actual geometry of a rectangle of known dimensions. This conversion is indicated by the arrow toward the right hand part of FIG. 3 in which the distortion-free, rectangular calibration code 100 is shown after the transformation.

Any desired standardized coordinate systems is basically conceivable as a target coordinate system for the transformation. An orthogonal, metric coordinate system is preferably used with metric units suitable for the measurement function of, for example, 1/10 mm or 1/100 mm. The imaging matrix M is a perspective transformation which can include a rotation, a translation and a rescaling. Subsequently, any desired other picture elements can then also be converted into the metric coordinate system with the aid of the imaging matrix determined from the corner points or other drawn points of the calibration code 100.

Figure 4:
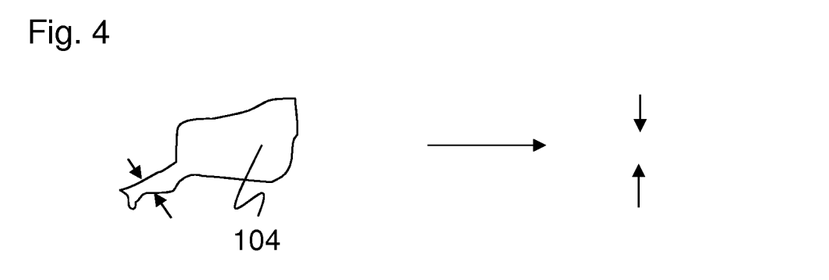
FIG. 4 shows the use of the transformation rule on two points of an object whose distance is measured.

FIG. 4 shows by way of example the use of the transformation rule on two points of an object 104 whose distance should be measured. The transformation in this respect corrects the distortion before the determination of the Euclidean distance. The transformation does not necessarily have to result in a perpendicular orientation of the distance to be measured, as shown. The distance of the two points after the transformation in any case delivers the metric length value corrected by the distortion.

The transformation rule determined once during the calibration procedure only maintains its validity for as long as the camera 10 maintains its perspective with respect to the codes 14 to be read or the objects to be measured. An embodiment will now be explained with reference to FIG. 5 in which the camera 10 automatically recognizes during operation whether a new calibration is required. If this is the case, a corresponding display can be carried out, for example, or a switch output can be set.

Figure 5:
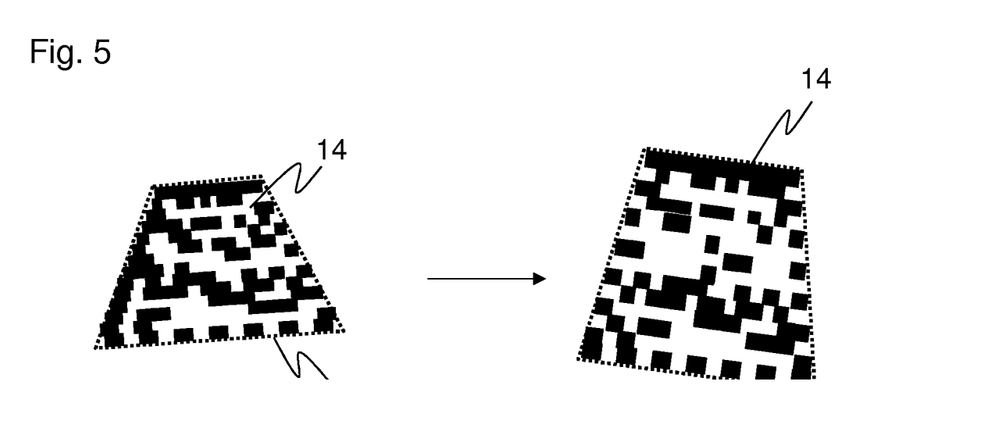
FIG. 5 shows a code taken with distortion with a trapezoidal envelope.

It is assumed for this purpose that the camera 10 is not used solely for measuring objects, but rather reads a code 14 at least from time to time. Its absolute geometry is known in dependence on the code type, for example a rectangular shape.

FIG. 5 shows in its left hand part a code 14 taken with distortion by way of example with a trapezoidal envelope 102. The transformation rule which rectifies this code 14 to a rectangular code is known from the calibration. Due to a change of the position or orientation of the camera 10 or due to a changed optics, this transformation, however, no longer results in a rectangle in the situation shown in FIG. 5, but rather in the trapezoidal envelope shown by way of example in the right hand part of FIG. 5. The camera 10 can conclude from this that the stored calibration is no longer valid.

The rectangular shape can practically be checked by whether the angles at the corner points of the transformed code range 14 amount to 90° at least within a specific tolerance. The tolerance threshold can be selected as adapted to the demands of the measurement work. If a larger deviation is recognized, the camera 10 outputs a corresponding error message or a demand to present the calibration code 100 again for a recalibration.

The camera 10 can also continue to output measurement results and provide it with an addition that the accuracy may possibly be impaired by erroneous calibration. An attempt can also be made to recalibrate the system automatically using the deviations of the geometry of the last taken code 14 after the transformation from a rectangle. In this respect, however, authorized assumptions with respect to the shape, but not to the unknown absolute values of this code 14 can at best be used as the basis so that the recalibration remains underdetermined and thus imprecise in comparison with a recalibration with calibration code 100.

Figure 6:
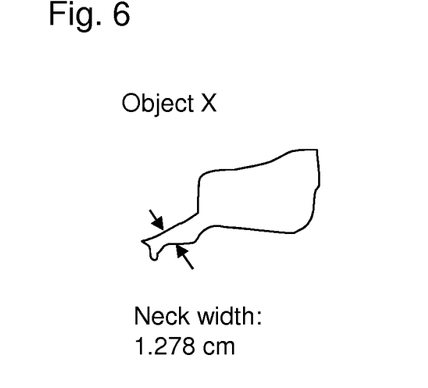
FIG. 6 shows a metric measurement image for the object and a metric dimension determined.

The transformation rule which transforms the calibration code 100 into a distortion-free calibration code 100 can in principle be applied to any desired image sections. A perspectively rectified gray value image can thus be produced, for example. In addition, a pixel can be resolved in subpixels, for example 10×10 subpixels, using interpolation techniques. This is also helpful to alleviate aliasing through the transformation. A highly resolved metric measurement image is produced or a part section thereof. The measurement points for measuring specific structures, read code information and further additional information can be added to this measurement image. FIG. 6 shows this by way of example for the object 14 and a metric dimension determined therein. Such measurement images help to detect and to check the measurement situation quickly visually. The images are preferably output as overlay files, for example as an XML file, with the image data and the additional information representing different structural information. The additional information is thereby coupled to the image data in an unambiguous, generally readable form and the original image information is simultaneously completely maintained.

The invention claimed is:

1. An optoelectronic apparatus (10) for measuring structural sizes or object sizes which has a light reception element (20) for converting received light into image data, a reception optics (16, 18) arranged before the light reception element (20) as well as an evaluation unit (22) which is configured to identify structures or objects in the image data, to determine their dimensions in picture elements and to convert the dimensions into absolute units of length with reference to a scaling factor, wherein the scaling factor is determined in a calibration procedure,
   wherein the evaluation unit (22) is configured to locate code regions in the image data and to read out code information from the code regions and to calculate the scaling factor during the calibration procedure from dimensions of a calibration code (100) whose code information includes a size indication for the calibration code (100) in the absolute units of length,
   wherein the evaluation unit (22) is configured to determine a transformation rule which transforms a relative geometry of the calibration code (100) in the image data into an absolute geometry, and
   wherein the evaluation unit (22) is configured to recognize an incorrect calibration in that the transformation rule is applied to a code in the image data and a check is made whether the code transformed by the transformation rule has an expected absolute geometry.

2. An apparatus (10) in accordance with claim 1,
   wherein the absolute units of length are metric units of length.

3. An apparatus (10) in accordance with claim 1,
   wherein the evaluation unit (22) is configured to check an identifier when reading out the calibration code (100), with reference to which identifier the calibration code (100) as such is recognizable.

4. An apparatus in accordance with claim 1,
   wherein the evaluation unit (22) is configured to determine the dimensions of the calibration code (100) from corner to corner during the calibration procedure.

5. An apparatus (10) in accordance with claim 1,
   wherein the evaluation unit (22) is configured to use an error-free reading of the calibration code (100) for the determination of the scaling factor.

6. An apparatus (10) in accordance with claim 1,
   wherein the evaluation unit (22) is configured to read out absolute geometry information from the calibration code (100).

7. An apparatus (10) in accordance with claim 6,
   wherein the evaluation unit (22) is configured to apply the transformation rule to a part region of the image data to produce a perspectively distorted image.

8. An apparatus (10) in accordance with claim 1,
   wherein the apparatus (10) is configured as a camera-based code reader whose light reception element (20) is a matrix or linear image sensor.

9. An apparatus (10) in accordance with claim 8,
   wherein the evaluation unit (22) is configured to determine picture elements having a finer resolution than the pixel resolution of the image sensor (20) by interpolation or averaging.

10. An apparatus (10) in accordance with claim 1,
    wherein the evaluation unit (22) is configured for decoding of 1D codes and 2D codes.

11. An apparatus (10) in accordance with claim 10,
    wherein the evaluation unit (22) is configured for the decoding of codes which are made up of bars or rectangular or square module units.

12. An apparatus (10) in accordance with claim 1,
    wherein a distance measurement unit is provided to determine the distance from a read code or from a detected object to the distance measurement unit.

13. An apparatus (10) in accordance with claim 12,
    wherein the distance measurement unit uses the principle of the time of flight of light determination.

14. An apparatus (10) in accordance with claim 12,
    wherein a memory (22) is provided to store, together with the scaling factor, a calibration reading distance at which the calibration code (100) was detected during the calibration procedure, and wherein the evaluation unit (22) is configured to adapt the dimensions of detected structures or objects using the actual distance at which the structures or objects were detected during the detection with the aid of the calibration reading distance.

15. A method of calibrating an optoelectronic apparatus (10) for measuring structural or object sizes which generates image data from received light, identifies structures or objects in the image data, determines their dimensions in picture elements and converts the dimensions into absolute units of length with reference to the scaling factor, wherein a scaling factor is determined during calibration,
    wherein a calibration code (100) is detected whose code information includes a size indication for the calibration code (100) in the absolute units of length; wherein the dimensions of the calibration code (100) are determined in picture elements, on the one hand, and by decoding the size indication, on the other hand; and wherein the scaling factor is calculated from the calibration code,
    wherein an evaluation unit (22) determines a transformation rule which transforms a relative geometry of the calibration code (100) in the image data into an absolute geometry, and
    wherein the evaluation unit (22) recognizes an incorrect calibration in that the transformation rule is applied to a code in the image data and a check is made whether the code transformed by the transformation rule has an expected absolute geometry.

16. A method in accordance with claim 15, wherein the absolute units of length are metric units of length.

17. An optoelectronic apparatus (10) for measuring structural sizes or object sizes which has a light reception element (20) for converting received light into image data, a reception optics (16, 18) arranged before the light reception element (20) as well as an evaluation unit (22) which is configured to identify structures or objects in the image data, to determine their dimensions in picture elements and to convert the dimensions into absolute units of length with reference to a scaling factor, wherein the scaling factor is determined in a calibration procedure,
    wherein the evaluation unit (22) is configured to locate code regions in the image data and to read out code information from the code regions and to calculate the scaling factor during the calibration procedure from dimensions of a calibration code (100) whose code information includes a size indication for the calibration code (100) in the absolute units of length,
    wherein a distance measurement unit is provided to determine the distance from a read code or from a detected object to the distance measurement unit, and
    wherein a memory (22) is provided to store, together with the scaling factor, the calibration reading distance at which the calibration code (100) was detected during the calibration procedure, and wherein the evaluation unit (22) is configured to adapt the dimensions of detected structures or objects using the actual distance at which the structures or objects were detected during the detection with the aid of the calibration reading distance.

* * * * *